(12) United States Patent
Kelly

(10) Patent No.: US 6,280,315 B1
(45) Date of Patent: Aug. 28, 2001

(54) TWO-WAY HINGELESS VENTILATOR

(76) Inventor: Timothy A. Kelly, 801 Virginia Ave., Salem, VA (US) 24153

(*) Notice: Subject to any disclaimer, the term of this patent is extended or adjusted under 35 U.S.C. 154(b) by 0 days.

(21) Appl. No.: 09/387,354

(22) Filed: Aug. 31, 1999

(51) Int. Cl.⁷ ..................................................... B60H 1/00
(52) U.S. Cl. ........................................... 454/145; 454/273
(58) Field of Search ..................................... 454/145, 149, 454/273, 333

(56) References Cited

U.S. PATENT DOCUMENTS

| | | |
|---|---|---|
| 3,046,865 | 7/1962 | Kelly . |
| 3,102,464 | 9/1963 | Kelly et al. . |
| 3,358,576 | 12/1967 | Kelly et al. . |
| 3,375,772 | 4/1968 | Kelly et al. . |
| 3,760,707 | 9/1973 | Kelly . |
| 3,839,950 | 10/1974 | Kelly et al. . |
| 4,452,129 | 6/1984 | Kelley et al. . |
| 4,519,645 | 5/1985 | Kelly et al. . |
| 4,522,115 | 6/1985 | Kelly et al. . |
| 4,938,122 * | 7/1990 | Ziemba .................................. 454/145 |
| 5,020,425 | 6/1991 | Kelly . |
| 5,766,068 | 6/1998 | Kelly . |

* cited by examiner

Primary Examiner—Jiping Lu
(74) Attorney, Agent, or Firm—Dority & Manning

(57) ABSTRACT

A two-way hingeless ventilator for ventilating an enclosure through a wall thereof has a frame defining an opening therethrough. A closure member is disposed against an outer side of the frame and is alternately swingable relative to the frame between open and closed positions at opposite sides of the opening. A tensioning rod is fixed on the frame and extends between opposite sides of the opening. An actuating member extends from an inner side of the closure member through the opening and intermediate ends of the tensioning rod. A positioning slot is defined in the actuating member through which the tensioning rod passes in a tensioned condition to apply a closing force to the closure member. The positioning slot has a central position defining a closed position of the cover member and opposite side slots extending away from the central position. The closure member is variably movable from the closed position to oppositely facing open positions by rotation or pivoting of the actuating member which causes the tensioning rod to variably engage along either of the side slots in its tensioned condition.

16 Claims, 5 Drawing Sheets

TWO-WAY HINGELESS VENTILATOR

BACKGROUND OF THE INVENTION

The present invention relates to a hingeless ventilator for ventilating a compartment or enclosure through a defining wall thereof. Hingeless ventilators are well known in the art and there are a number of Kelly and Kelly et al. patents on hingeless ventilators particularly designed for ventilating a cab or other compartment of a vehicle. Among these patents are U.S. Pat. Nos. 3,102,464; 3,358,576; 3,839,950; 4,452,129; 5,020,425; and 5,766,068. All of these patents describe two-way hingeless ventilators having closure members openable in one direction to draw air into the compartment, and openable in an opposite direction to exhaust air from the vehicle compartment. Thus, these types of ventilators that can be opened in both directions are conventionally referred to as "two-way" hingeless ventilators.

U.S. Pat. No. 3,375,772 to Kelly et al. describes a "one-way" hingeless ventilator having a cover member that is swingable in an arc in one direction between open and closed positions. The device described in the '772 patent includes a tension rod mounted on a frame for holding the cover member in position. The cover has a guide secured to an inner face thereof having a guide way which is slidably engaged with the tension rod. This device, however, cannot be used as a two-way hingeless ventilator and, thus, lacks the inherent utility of a two-way hingeless ventilator.

OBJECTS AND SUMMARY OF THE INVENTION

It is therefore a principal object of the present invention to provide an improved two-way hingeless ventilator.

An additional object of the present invention is to provide an improved two-way hingeless ventilator having a simplified design and operating mechanism as compared to conventional two-way hingeless ventilators.

Additional objects and advantages of the invention will be set forth in part in the following description, or may be obvious from the description, or may be learned through practice of the invention.

In accordance with the objects and purposes of the invention, a two-way hingeless ventilator is provided for ventilating an enclosure through a wall thereof. The hingeless ventilator according to the invention is not particularly limited in its field of use, and may be used wherever it is desired to ventilate a compartment or space.

The hingeless ventilator according to the invention includes a frame defining a central opening therethrough. Preferably, a perforated plate or screen member is disposed across the central opening. The perforated plate or screen member may be formed integral with the frame.

A closure member is disposed against an outer side of the frame to seal the central opening in a closed position. The closure member is alternately swingable relative to the frame between open and closed positions at opposite sides of the opening. Thus, the closure member has a "two-way" operation. The closure member has a shape, for example as defined by flanges, so as to align and seal against complimenting portions of the frame member. The closure member may include a unitary bracket with a cover member attached thereto.

A tensioning or spring rod is fixed or attached to the frame and extends between opposite sides of the central opening. In a preferred embodiment, the central opening has a generally rectangular shape and the tensioning rod is fixed to the frame across the longer aspect of the rectangular opening.

An actuating member extends from an inner side of the closure member through the central opening in the frame and is located between the ends of the tensioning rod. In a preferred embodiment, the actuating member is centered longitudinally relative to the tensioning rod. The actuating member may comprise any configuration and, in a preferred embodiment, is a plate member extending from the inner side of the closure member. The actuating member may comprise a plate formed integral with the unitary plate and bent at a right angle relative thereto. In an alternative embodiment, the actuating member may comprise a plate that is welded or otherwise attached to the closure member. The actuating member extends in a plane that is substantially perpendicular to the longitudinal axis of the tensioning rod.

The tensioning rod passes through a positioning slot defined in the actuating member. The positioning slot is defined so that the tensioning rod is maintained in a constant state of tension to apply a closing force to the closure member. The positioning slot comprises a shape so that the closure member can be pivoted or moved to an open position in either direction relative to the longitudinal axis of the frame to give the closure member its "two-way" operation. In a preferred embodiment, the positioning slot comprises a central position defining the closed position of the cover member, and opposite side slots that extend away from, for example at an angle or arc, from the central position. The closure member is variably movable from the closed position to oppositely facing open positions by movement of the actuating member that causes the tensioning rod to slide relative to either of the side slots in its tensioned condition. In a preferred embodiment, the positioning slot has a generally V-shape with the closed position being defined at the apex of the V-shape.

The actuating member also includes a handle member or operating mechanism attached thereto so that an operator can easily operate the ventilator manually or by way of a power or driven assist.

Other features of the present two-way hingeless ventilator will be described in greater detail below through use of the appended figures.

DETAILED DESCRIPTION

Figure 1:
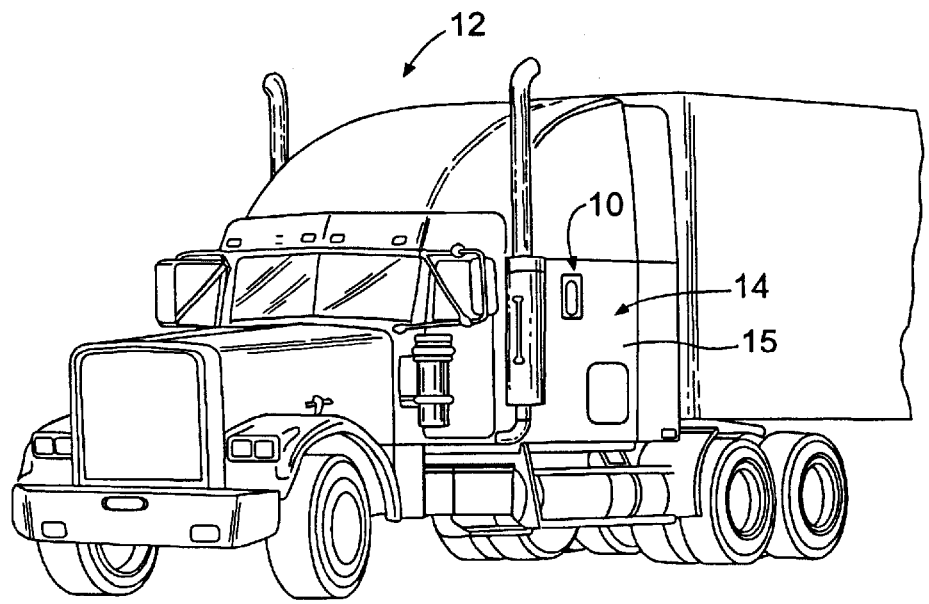
FIG. 1 is a perspective view of a two-way hingeless ventilator according to the invention used as a ventilator for a truck compartment.
Figure 2:
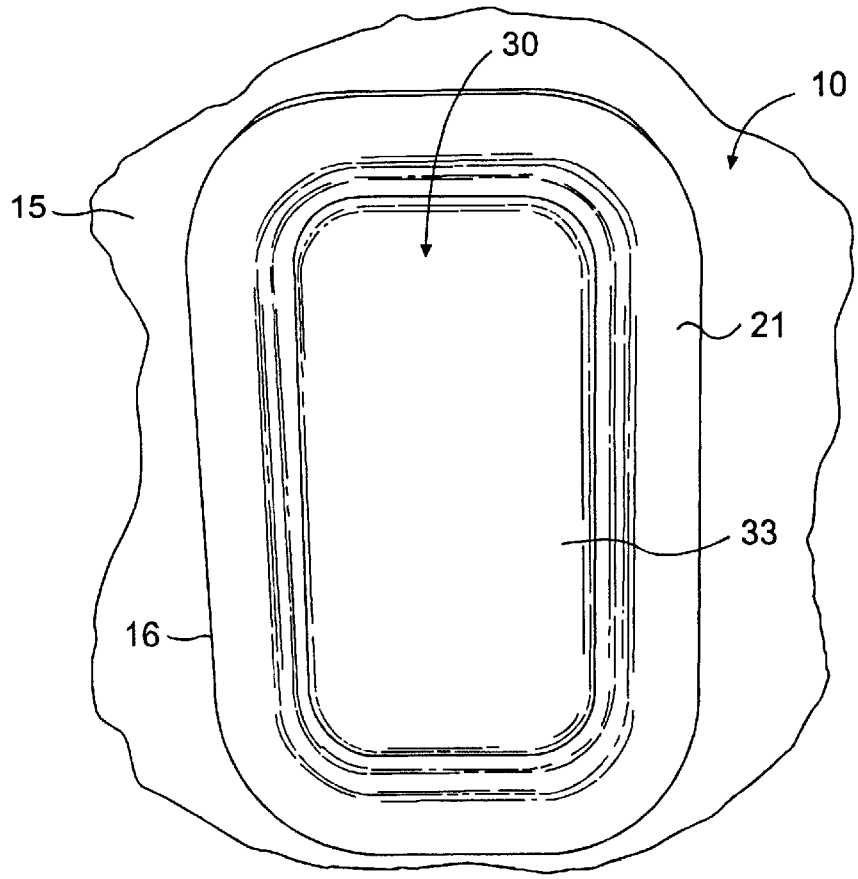
FIG. 2 is a front perspective view of the ventilator unit according to the invention.
Figure 3:
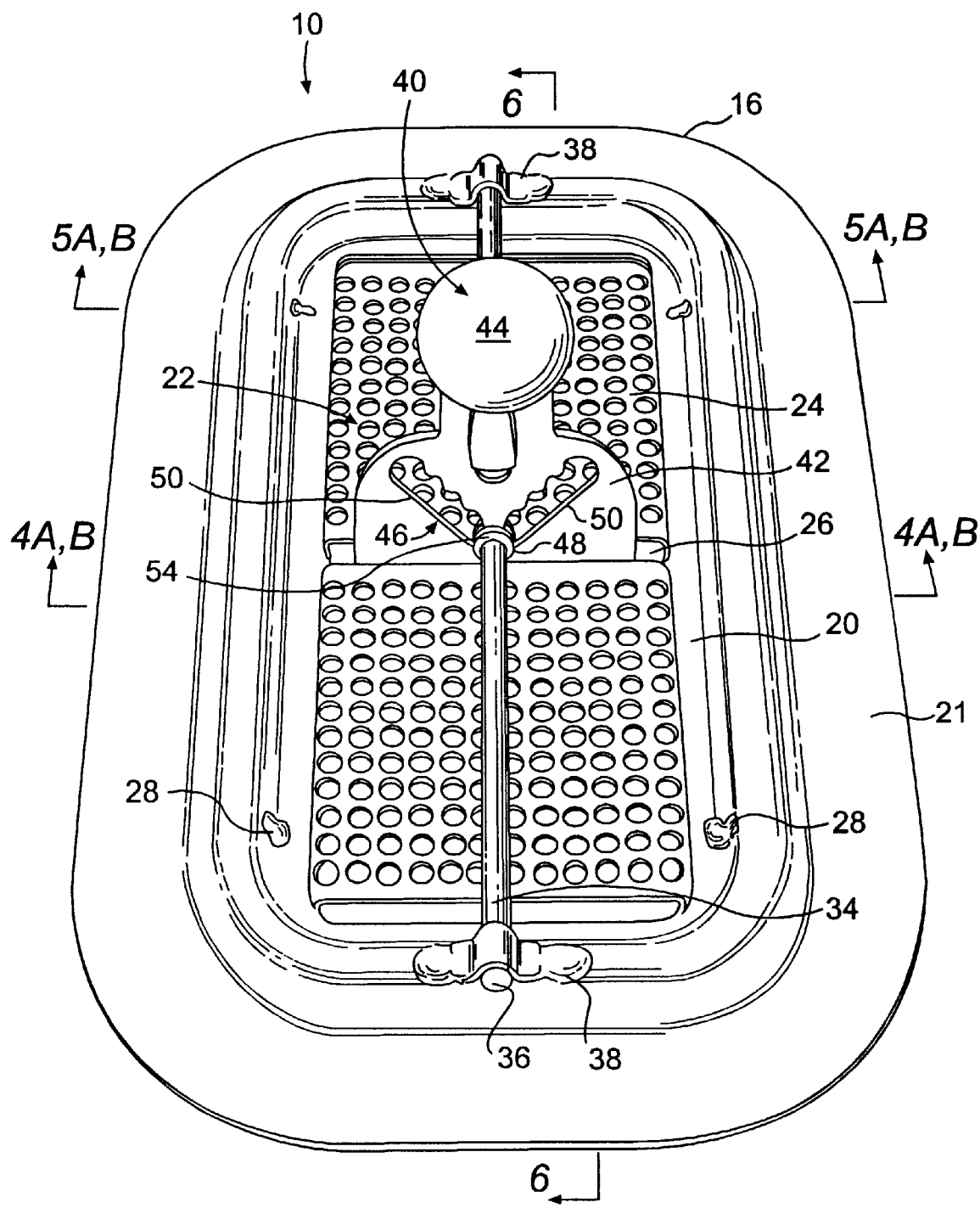
FIG. 3 is a perspective back view of the ventilator according to the invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations.

Two-way hingeless ventilators of the present type are well understood by those skilled in the art and the operation thereof is described in detail in various U.S. patents, particularly U.S. Pat. No. 5,766,068; U.S. Pat. No. 3,839,950; U.S. Pat. No. 4,452,129; and U.S. Pat. No. 5,020,425, the disclosures of which are incorporated herein in their entirety for all purposes. Thus, it is not essential for purposes of the present description to provide a detailed explanation of the hingeless ventilator features common to the prior art and described in the cited patents. Such features will be described generally to the extent necessary to provide a complete understanding of the present invention.

The hingeless ventilator 10 according to the invention is illustrated generally in FIG. 1 as a ventilator used to ventilate a compartment 14 of truck 12. Ventilator 10 is disposed through a defining wall 15 of compartment 14. It should be appreciated, however, that the field of use of ventilator 10 is not limited to vehicle compartments or cabs. Ventilator 10 may be used in any environment wherein it is desired to ventilate an enclosed space, compartment, or the like.

Hingeless ventilator 10 according to the invention includes a frame, generally 16, configured for attachment to wall 15. Frame 16 includes a circumferential flange 21 that defines a central opening 22 therethrough for passing air through ventilator 10 into or out of compartment 14, as is well understood by those skilled in the art. opening 22 may be defined by any suitable structure, for example flange 20 of frame 16. A member having air passages defined therethrough, preferably a perforated plate or screen member 24, covers opening 22. Perforated plate 24 may be connected to frame 16 in any manner, or may be formed integral therewith.

Figure 4A:
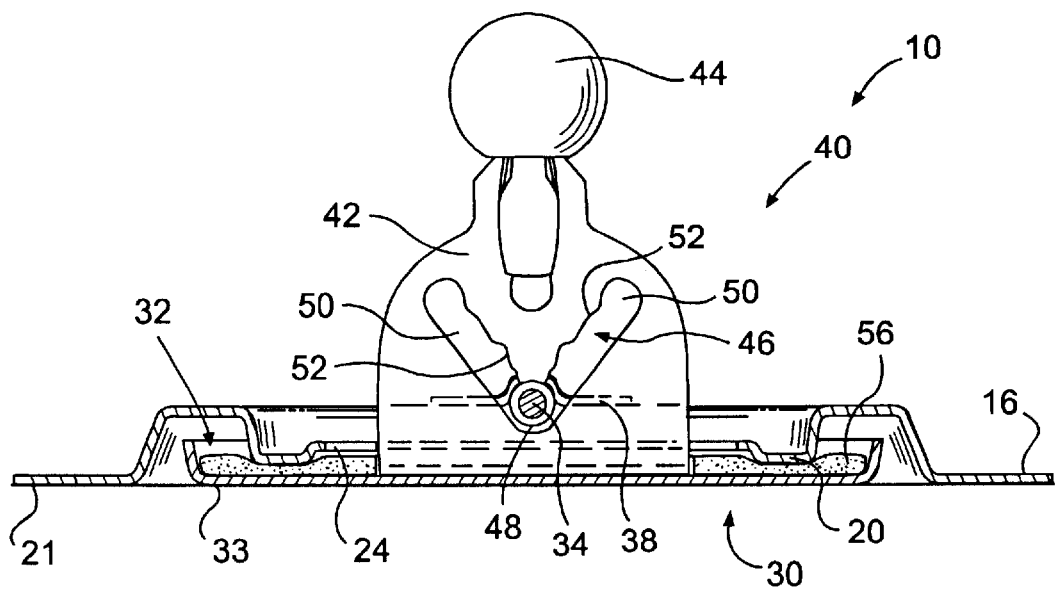
FIG. 4a is a cross-sectional view of the ventilator taken along the lines indicated in FIG. 3.
Figure 4B:
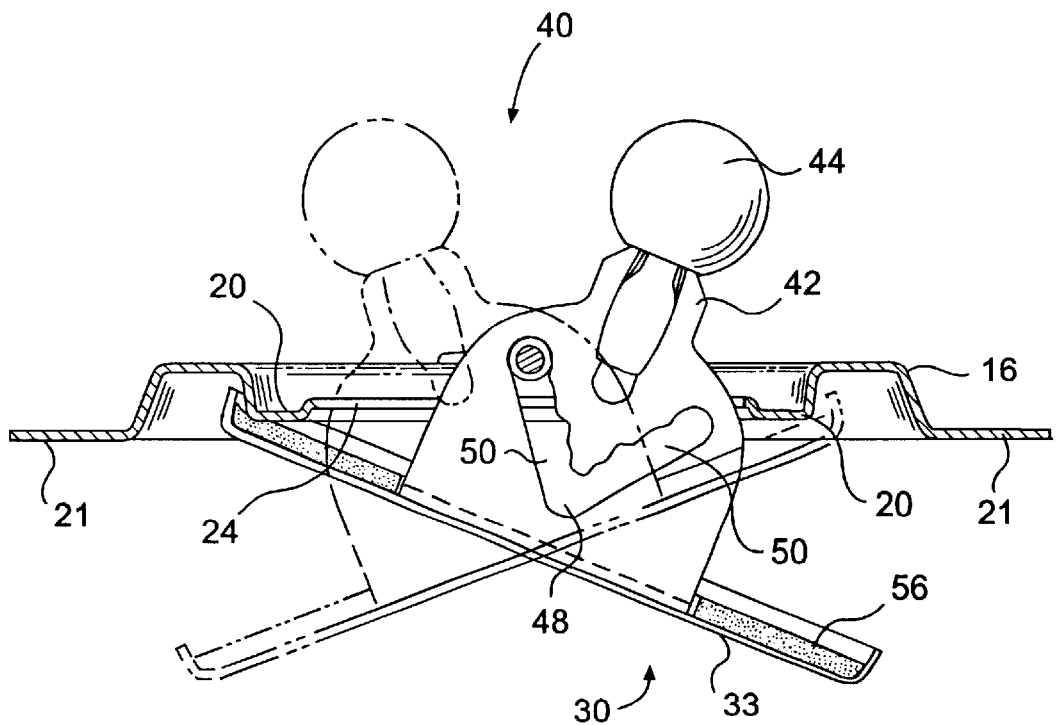
FIG. 4b is a cross-sectional operational view of the ventilator taken along the lines indicated in FIG. 3.
Figure 5A:
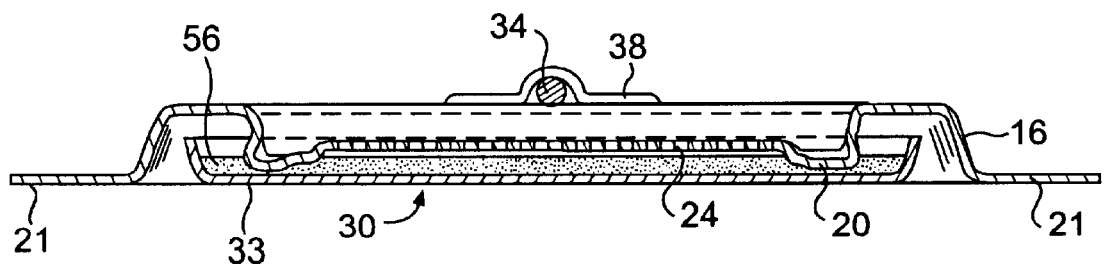
FIG. 5a is a cross-sectional view of the ventilator taken along the lines indicated in FIG. 3.
Figure 5B:
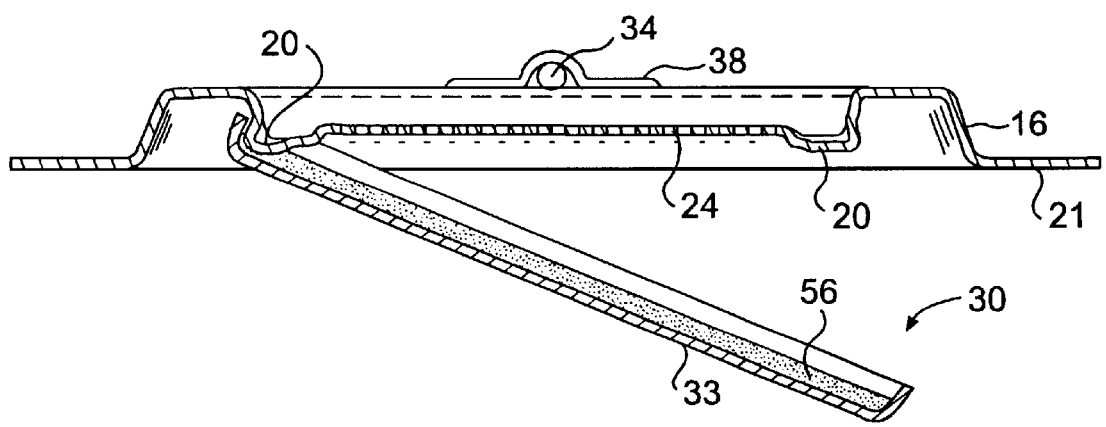
FIG. 5b is a cross-sectional operational view of the ventilator taken along the lines indicated in FIG. 3.

A closure member, generally 30, is provided and is swingable against an outer side of frame 16 for opening and closing central opening 22. Closure member 30 is openable in one direction so as to force air into the respective compartment, and openable in the opposite direction to draw air out of the compartment. This "two-way" operation of closure member 30 is illustrated in FIG. 4b. Closure member 30 includes a cover member 33 that may be formed by a plate material or member, or molded from a plastic material. A gasketing material 56 is disposed on an inner side 32 of closure member 30 for aiding in sealing engagement between closure member 30 and flange 20 of frame member 16. Closure member 30 is "centered" relative to flange 20 and opening 22 by alignment nubs 28 formed on flange 20. In an alternative embodiment, closure member 30 may be formed in accordance with U.S. Pat. No. 5,766,068, the entire disclosure of which is incorporated herein in its entirety for all purposes. In the '068 patent, the closure member is formed by a unitary plate or bracket having an aesthetic cover member attached thereto.

Ventilator 10 also includes a tensioning rod 34 having ends 36 fixed to frame 16 between opposite sides of opening 22. As illustrated in the figures, tensioning rod 34 is preferably disposed longitudinally relative to the longer or lengthwise aspect of opening 22 and centered relative to the opening. Tensioning rod 34 may be held to frame 16 by any conventional manner, such as brackets 38 illustrated in the figures. Tensioning rod 34 is in a constant tensioned state regardless of the position of closure member 30 so as to apply a constant closing force to the closure member, as will be described in greater detail below.

Ventilator 10 also includes an actuating member, generally 40, extending from an inner side of closure member 30 through an opening or slot 26 defined through perforated plate 24. In the embodiment wherein closure member 30 includes a unitary bracket as described in the cited '068 patent, actuating member 40 may include a section of the unitary bracket bent at a right angle relative to closure member 30. In an alternative embodiment illustrated in the figures, actuating member 40 may be defined by a plate member 42 welded or otherwise attached to closure member 30. It should be appreciated that actuating member 40 can comprise any manner of configuration, shape, material, and the like.

Actuating member 40 also includes a handle, such as ball handle 44 illustrated in the figures, or any other suitable operating mechanism, manual or powered, that allows an operator or operating mechanism to rotate or pivot actuating member 40 relative to tensioning rod 34.

Figure 6:
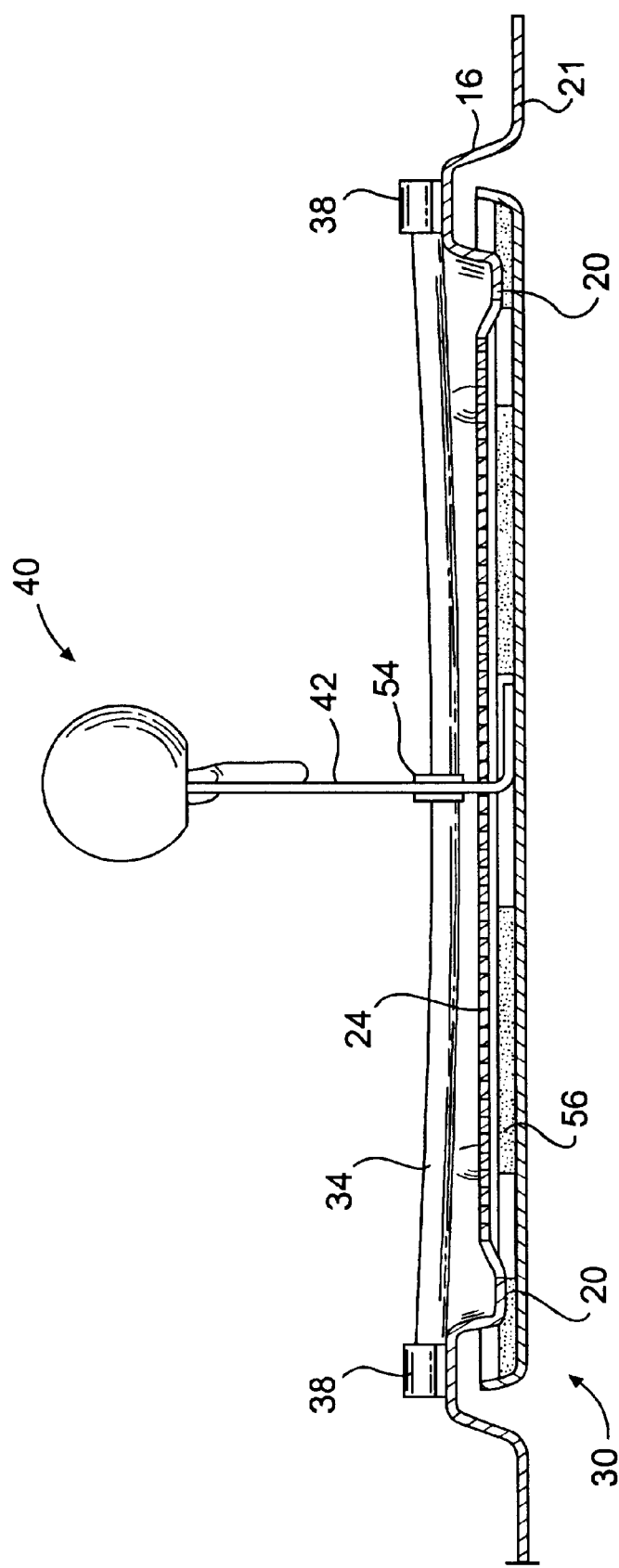
FIG. 6 is a cross-sectional view of the ventilator taken along the lines indicated in FIG. 3.

Actuating member 40 includes a positioning slot, generally 46, defined therethrough. Tensioning rod 34 passes through this positioning slot in a tensioned condition so as to apply a force to hold closure member 30 against frame 16, as particularly illustrated in FIG. 6.

Positioning slot 46 is disposed in a plane of actuating member 40, for example through plate 42, so as to be oriented substantially perpendicular to a longitudinal axis of tensioning rod 34. Positioning slot 46 has a shape so that the closure member can be moved to an open position in either direction relative to the longitudinal axis of tensioning rod 34, as illustrated in FIG. 4b. In the embodiment illustrated in the figures, positioning slot 46 includes a central position 48 defined at the apex of a generally V-shaped slot 46. Central position 48 engaged by tensioning rod 34 defines the closed position of closure member 30, as illustrated in FIG. 4a. Opposite side slots 50 extend at an angle from central position 48. Side slots 50 define the opposite open positions of closure member 30, as illustrated in FIG. 4b.

In order to open closure member 30 in either direction, an operator or powered mechanism pushes or rotates actuating member 40 to either side of the longitudinal axis of tensioning rod 34. This action causes tensioning rod 34 to variably engage along either of side slots 50 thereby causing closure member 30 to swing away from flange 20 on the opposite side, as illustrated in FIG. 4b. Side slots 50 may have variable positioning recesses or divots 52 defined therealong so that closure member 30 can be held in variable open positions defined along side slots 50.

Regardless of the relative position of tensioning rod 34 along either of side slots 50, the tensioning rod applies a continuous force to closure member 30 relative to frame 16. In this manner, closure member 30 is variably positionable relative to frame 16 yet is held against frame 16 so as not to rattle or vibrate. When actuating member 40 is moved to the closed position of FIG. 4a, a normal closing force is applied to closure member 30 causing closure member to seal against flange 20 of frame 16.

Preferably, a friction reducing device, such as a roller or collar 54, is configured with tensioning rod 34 where the rod passes through actuating member 40.

It should be appreciated by those skilled in the art that various modifications and variations can be made in the present invention without departing from the scope and spirit of the invention. For example, positioning slot 46 may be defined in any suitable shape that allows for opening of the closure member along opposite sides. Positioning slot 46 may, for example, have a step-wise shape, divots, detents, etc. in this regard. It should also be appreciated that the invention is not limited to the particular types of materials used for the components thereof. It should also be appreciated that the ventilator according to the invention is not limited in its overall shape or configuration, although a rectangular shape is preferred.

It is intended that the present invention include such modifications and variations as come within the scope of the appended claims and their equivalents.

What is claimed is:

1. A two-way hingeless ventilator for ventilating an enclosure through a wall thereof, comprising:
   a frame, said frame defining an opening therethrough;
   a closure member disposed against an outer side of said frame and alternately swingable relative to said frame between open and closed positions at opposite sides of said opening;
   a tensioning rod non-movably fixed on said frame and extending between opposite sides of said opening;
   an actuating member extending from an inner side of said closure member through said opening and intermediate ends of said tensioning rod;
   a positioning slot defined in said actuating member through which said tensioning rod passes in a tensioned condition to apply a closing force to said closure member, said positioning slot comprising a central position defining a closed position of said closure member, and opposite side slots extending away from said central position; and
   wherein said closure member is variably movable relative to said tensioning rod from said closed position to oppositely facing open positions along said side slots by an operator rotating said actuating member causing said tensioning rod to engage along either of said side slots in its tensioned condition.

2. The ventilator as in claim 1, wherein said positioning slot comprises a generally V-shaped slot.

3. The ventilator as in claim 1, further comprising variable open positions defined along each of said side slots.

4. The ventilator as in claim 1 further comprising a friction reducing device configured with said tensioning rod where said tensioning rod passes through said actuating member.

5. The ventilator as in claim 1, wherein said actuating member is substantially centered longitudinally relative to said tensioning rod.

6. The ventilator as in claim 1, wherein said closure member and said actuating member are formed from plate members and said actuating member extends at an essentially right angle relative to said closure member.

7. The ventilator as in claim 6, further comprising a sealing gasket material attached to an underside of said closure member for sealing engagement with said frame member in said closed position of said closure member.

8. The ventilator as in claim 1, further comprising a member having air passages defined therethrough extending across said opening in said frame, said actuating member extending through said air passage member.

9. The ventilator as in claim 8, wherein said air passage member and said frame are formed as an integral component.

10. A two-way hingeless ventilator for ventilating an enclosure through a wall thereof, comprising:
    a frame, said frame defining an opening therethrough;
    a closure member disposed against an outer side of said frame and alternately swingable relative to said frame between open and closed positions at opposite sides of said opening;
    a tensioning rod non-movably fixed on said frame and extending between opposite sides of said opening;
    an actuating member extending from an inner side of said closure member through said opening and intermediate ends of said tensioning rod; and
    a positioning slot defined in said actuating member through which said tensioning rod passes in a tensioned condition to apply a closing force to said closure member, said positioning slot comprising a shape including slots extending generally oppositely away from a fixed longitudinal axis of said tensioning rod so that said closure member can be swung to an open position in either direction relative to a said fixed longitudinal axis of said tensioning rod.

11. The ventilator as in claim 10, wherein said positioning slot comprises a central position defining a closed position of said cover member, and opposite side slots extending away from said central position; and wherein said closure member is variably movable from said closed position to oppositely facing open positions by movement of said actuating member causing relative movement between said tensioning rod and either of said side slots.

12. The ventilator as in claim 11, wherein said positioning slot is generally a V-shaped slot.

13. The ventilator as in claim 10, further comprising an operating mechanism attached to said actuating member.

14. The ventilator as in claim 10, wherein said actuating member comprises a plate disposed in a plane substantially perpendicular to a longitudinal axis of said tensioning rod, said positioning slot defined in said plate.

15. The ventilator as in claim 14, wherein said actuating member is substantially centered longitudinally relative to said tensioning rod.

16. The ventilator as in claim 14, further comprising variable open positions defined along said positioning slot.

* * * * *